United States Patent
Braness

(10) Patent No.: US 9,967,305 B2
(45) Date of Patent: May 8, 2018

(54) SYSTEMS, METHODS, AND MEDIA FOR STREAMING MEDIA CONTENT

(71) Applicant: DIVX, LLC, San Diego, CA (US)

(72) Inventor: Jason A Braness, San Diego, CA (US)

(73) Assignee: DIVX, LLC, San Diego, CA (US)

(*) Notice: Subject to any disclaimer, the term of this patent is extended or adjusted under 35 U.S.C. 154(b) by 240 days.

(21) Appl. No.: 13/931,198

(22) Filed: Jun. 28, 2013

(65) Prior Publication Data
US 2015/0006662 A1    Jan. 1, 2015

(51) Int. Cl.
G06F 15/167  (2006.01)
H04L 29/06   (2006.01)

(52) U.S. Cl.
CPC ........ H04L 65/607 (2013.01); H04L 65/4084 (2013.01)

(58) Field of Classification Search
CPC .................................................. H04L 65/607
See application file for complete search history.

(56) References Cited

U.S. PATENT DOCUMENTS

| | | | |
|---|---|---|---|
| 4,009,331 A | 2/1977 | Goldmark et al. | |
| 4,694,357 A | 9/1987 | Rahman et al. | |
| 4,802,170 A | 1/1989 | Trottier | |
| 4,964,069 A | 10/1990 | Ely | |
| 5,119,474 A | 6/1992 | Beitel et al. | |
| 5,274,758 A | 12/1993 | Beitel et al. | |
| 5,361,332 A | 11/1994 | Yoshida et al. | |
| 5,396,497 A | 3/1995 | Veltman | |
| 5,404,436 A | 4/1995 | Hamilton | |
| 5,420,801 A | 5/1995 | Dockter et al. | |
| 5,420,974 A | 5/1995 | Morris et al. | |
| 5,471,576 A | 11/1995 | Yee | |
| 5,479,303 A | 12/1995 | Suzuki et al. | |
| 5,487,167 A | 1/1996 | Dinallo et al. | |
| 5,502,766 A | 3/1996 | Boebert et al. | |

(Continued)

FOREIGN PATENT DOCUMENTS

CN    1169229        12/1997
CN    1221284 A      6/1999
(Continued)

OTHER PUBLICATIONS

Author Unknown, "Turbo-Charge Your Internet and PC Performance", printed Oct. 30, 2008 from Speedtest.net—The Global Broadband Speed Test, 1 pg.
(Continued)

*Primary Examiner* — Michael A Keller
(74) *Attorney, Agent, or Firm* — KPPB LLP

(57) ABSTRACT

Methods, systems, and computer readable media for streaming media content are provided. In some embodiments, the methods comprise: receiving top level index data from a server; caching the top level index data in an index file; receiving header data associated with a first media content file from the server; caching the header data in a header file; receiving a first segment of the first media content file based at least in part on the index file; caching the first segment of the first media content file in a first file; updating the index file to include information about the first file; and causing the first fragment to be displayed based at least in part on the index file and the header file.

33 Claims, 7 Drawing Sheets

(56) References Cited

U.S. PATENT DOCUMENTS

| | | |
|---|---|---|
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,589,993 A | 12/1996 | Naimpally et al. |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,754,648 A | 5/1998 | Ryan et al. |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,822,524 A | 10/1998 | Chen et al. |
| 5,828,370 A | 10/1998 | Moeller et al. |
| 5,841,432 A | 11/1998 | Carmel et al. |
| 5,844,575 A | 12/1998 | Reid |
| 5,848,217 A | 12/1998 | Tsukagoshi et al. |
| 5,867,625 A | 2/1999 | McLaren |
| 5,887,110 A | 3/1999 | Sakamoto et al. |
| 5,892,900 A | 4/1999 | Ginter et al. |
| 5,903,261 A | 5/1999 | Walsh et al. |
| 5,907,597 A | 5/1999 | Mark |
| 5,946,446 A | 8/1999 | Yanagihara |
| 5,956,729 A | 9/1999 | Goetz et al. |
| 5,959,690 A | 9/1999 | Toebes, VIII et al. |
| 5,999,812 A | 12/1999 | Himsworth |
| 6,031,622 A | 2/2000 | Ristow et al. |
| 6,038,257 A | 3/2000 | Brusewitz et al. |
| 6,044,469 A | 3/2000 | Horstmann |
| 6,046,778 A | 4/2000 | Nonomura et al. |
| 6,047,100 A | 4/2000 | McLaren |
| 6,058,240 A | 5/2000 | McLaren |
| 6,064,794 A | 5/2000 | McLaren |
| 6,065,050 A | 5/2000 | DeMoney |
| 6,018,611 A | 6/2000 | Nogami et al. |
| 6,079,566 A | 6/2000 | Eleftheriadis et al. |
| 6,097,877 A | 8/2000 | Katayama et al. |
| 6,141,754 A | 10/2000 | Choy |
| 6,155,840 A | 12/2000 | Sallette |
| 6,169,242 B1 | 1/2001 | Fay et al. |
| 6,175,921 B1 | 1/2001 | Rosen |
| 6,195,388 B1 | 2/2001 | Choi et al. |
| 6,204,883 B1 | 3/2001 | Tsukagoshi |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,418,270 B1 | 7/2002 | Steenhof et al. |
| 6,449,719 B1 | 9/2002 | Baker |
| 6,466,671 B1 | 10/2002 | Maillard et al. |
| 6,466,733 B1 | 10/2002 | Kim |
| 6,510,513 B1 | 1/2003 | Danieli |
| 6,510,554 B1 | 1/2003 | Gordon et al. |
| 6,621,979 B1 | 9/2003 | Eerenberg et al. |
| 6,625,320 B1 | 9/2003 | Ghanbari |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,697,568 B1 | 2/2004 | Kaku |
| 6,725,281 B1 | 4/2004 | Zintel |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,389 B1 | 10/2004 | Meyer |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,917,652 B2 | 7/2005 | Lyu |
| 6,944,621 B1 | 9/2005 | Collart |
| 6,944,629 B1 | 9/2005 | Shioi et al. |
| 6,956,901 B2 | 10/2005 | Boroczky et al. |
| 6,965,724 B1 | 11/2005 | Boccon-Gibod et al. |
| 6,965,993 B2 | 11/2005 | Baker |
| 6,985,588 B1 | 1/2006 | Glick et al. |
| 6,988,144 B1 | 1/2006 | Luken et al. |
| 7,007,170 B2 | 2/2006 | Morten |
| 7,023,924 B1 | 4/2006 | Keller et al. |
| 7,043,473 B1 | 5/2006 | Rassool et al. |
| 7,127,155 B2 | 10/2006 | Ando et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,197,234 B1 | 3/2007 | Chatterton |
| 7,209,892 B1 | 4/2007 | Galuten et al. |
| 7,231,132 B1 | 6/2007 | Davenport |
| 7,237,061 B1 | 6/2007 | Boic |
| 7,242,772 B1 | 7/2007 | Tehranchi |
| 7,295,673 B2 | 11/2007 | Grab et al. |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,356,143 B2 | 4/2008 | Morten |
| 7,356,245 B2 | 4/2008 | Belknap et al. |
| 7,366,788 B2 | 4/2008 | Jones et al. |
| 7,376,831 B2 | 5/2008 | Kollmyer et al. |
| 7,406,174 B2 | 7/2008 | Palmer |
| 7,421,411 B2 | 9/2008 | Kontio et al. |
| 7,457,359 B2 | 11/2008 | Mabey et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,938 B2 | 3/2009 | Collart |
| 7,526,450 B2 | 4/2009 | Hughes et al. |
| 7,594,271 B2 | 9/2009 | Zhuk et al. |
| 7,610,365 B1 | 10/2009 | Kraft et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,817,608 B2 | 10/2010 | Rassool et al. |
| 7,869,691 B2 | 1/2011 | Kelly et al. |
| 7,962,942 B1 | 6/2011 | Craner |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |

(56) References Cited

U.S. PATENT DOCUMENTS

| | | |
|---|---|---|
| 8,270,819 B2 | 9/2012 | Vannier |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 | 11/2012 | Xu |
| 8,311,115 B2 | 11/2012 | Gu et al. |
| 8,321,556 B1 | 11/2012 | Chatterjee et al. |
| 8,386,621 B2 | 2/2013 | Park |
| 8,401,900 B2 | 3/2013 | Cansler et al. |
| 8,412,841 B1 | 4/2013 | Swaminathan et al. |
| 8,452,110 B2 | 5/2013 | Shoham et al. |
| 8,456,380 B2 | 6/2013 | Pagan |
| 8,472,792 B2 | 6/2013 | Butt |
| 8,473,630 B1 * | 6/2013 | Galligan .................. 709/231 |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,595,378 B1 | 11/2013 | Cohn |
| 8,606,069 B2 | 12/2013 | Okubo et al. |
| 8,640,166 B1 | 1/2014 | Craner et al. |
| 8,681,866 B1 | 3/2014 | Jia |
| 8,726,264 B1 | 5/2014 | Allen et al. |
| RE45,052 E | 7/2014 | Li |
| 8,774,609 B2 | 7/2014 | Drake et al. |
| 8,781,122 B2 | 7/2014 | Chan et al. |
| 8,805,109 B2 | 8/2014 | Shoham et al. |
| 8,806,188 B2 | 8/2014 | Braness et al. |
| 8,843,586 B2 | 9/2014 | Pantos et al. |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,636 B2 | 12/2014 | Kiefer et al. |
| 8,918,908 B2 | 12/2014 | Ziskind et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,042,670 B2 | 5/2015 | Carmel et al. |
| 9,094,737 B2 | 7/2015 | Shivadas et al. |
| 9,124,773 B2 | 9/2015 | Chan et al. |
| 9,184,920 B2 | 11/2015 | Grab et al. |
| 9,191,457 B2 | 11/2015 | Van der Schaar |
| 9,197,685 B2 | 11/2015 | Soroushian et al. |
| 9,210,481 B2 | 12/2015 | Braness et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,264,475 B2 | 2/2016 | Shivadas et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,621,522 B2 | 4/2017 | Kiefer et al. |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0053222 A1 | 12/2001 | Wakao |
| 2002/0026560 A1 | 2/2002 | Jordan et al. |
| 2002/0034252 A1 | 3/2002 | Owen et al. |
| 2002/0051494 A1 | 5/2002 | Yamaguchi et al. |
| 2002/0057898 A1 | 5/2002 | Normile |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0110193 A1 | 8/2002 | Yoo et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0136298 A1 | 9/2002 | Anantharamu et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0159598 A1 | 10/2002 | Rubinstein et al. |
| 2002/0161462 A1 | 10/2002 | Fay |
| 2002/0180929 A1 | 12/2002 | Schwartz et al. |
| 2002/0184159 A1 | 12/2002 | Tayadon et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee |
| 2003/0061305 A1 | 3/2003 | Copley et al. |
| 2003/0061369 A1 | 3/2003 | Aksu et al. |
| 2003/0065777 A1 | 4/2003 | Mattila et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0006701 A1 | 1/2004 | Kresina |
| 2004/0021684 A1 | 2/2004 | Millner |
| 2004/0024688 A1 | 2/2004 | Bi et al. |
| 2004/0025180 A1 | 2/2004 | Begeja et al. |
| 2004/0031058 A1 | 2/2004 | Reisman |
| 2004/0039916 A1 | 2/2004 | Aldis et al. |
| 2004/0047614 A1 | 3/2004 | Green |
| 2004/0052501 A1 | 3/2004 | Tam |
| 2004/0071453 A1 | 4/2004 | Valderas |
| 2004/0081333 A1 | 4/2004 | Grab |
| 2004/0081434 A1 | 4/2004 | Jung et al. |
| 2004/0093618 A1 | 5/2004 | Baldwin et al. |
| 2004/0105549 A1 | 6/2004 | Suzuki et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0184616 A1 | 9/2004 | Morten et al. |
| 2004/0202320 A1 | 10/2004 | Amini et al. |
| 2004/0217971 A1 | 11/2004 | Kim |
| 2004/0255115 A1 | 12/2004 | DeMello et al. |
| 2004/0255236 A1 | 12/2004 | Collart |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0071280 A1 | 3/2005 | Irwin et al. |
| 2005/0108320 A1 | 5/2005 | Lord |
| 2005/0114896 A1 | 5/2005 | Hug |
| 2005/0149450 A1 | 7/2005 | Stefik et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |

(56) References Cited

U.S. PATENT DOCUMENTS

| | | |
|---|---|---|
| 2005/0254508 A1* | 11/2005 | Aksu et al. ............... 370/428 |
| 2005/0273695 A1 | 12/2005 | Schnurr |
| 2005/0275656 A1 | 12/2005 | Corbin et al. |
| 2006/0026294 A1 | 2/2006 | Virdi et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki |
| 2006/0129909 A1 | 6/2006 | Butt et al. |
| 2006/0168639 A1 | 7/2006 | Gan et al. |
| 2006/0173887 A1 | 8/2006 | Breitfeld et al. |
| 2006/0179239 A1 | 8/2006 | Fluhr |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1* | 12/2006 | Armangau et al. ........... 707/205 |
| 2007/0005333 A1 | 1/2007 | Setiohardjo et al. |
| 2007/0031110 A1 | 2/2007 | Rijckaert |
| 2007/0044010 A1 | 2/2007 | Sull et al. |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0271317 A1 | 11/2007 | Carmel et al. |
| 2007/0271385 A1 | 11/2007 | Davis et al. |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1 | 12/2007 | Kwan |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008455 A1 | 1/2008 | De Lange et al. |
| 2008/0043832 A1 | 2/2008 | Barkley et al. |
| 2008/0066099 A1 | 3/2008 | Brodersen et al. |
| 2008/0066181 A1 | 3/2008 | Haveson et al. |
| 2008/0086456 A1 | 4/2008 | Rasanen et al. |
| 2008/0086747 A1 | 4/2008 | Rasanen et al. |
| 2008/0101466 A1 | 5/2008 | Swenson et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0126248 A1 | 5/2008 | Lee et al. |
| 2008/0137541 A1 | 6/2008 | Agarwal |
| 2008/0137736 A1 | 6/2008 | Richardson et al. |
| 2008/0151817 A1 | 6/2008 | Fitchett |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0205860 A1 | 8/2008 | Holtman |
| 2008/0209534 A1* | 8/2008 | Keronen ............ G06Q 20/346 726/9 |
| 2008/0240144 A1 | 10/2008 | Kruse et al. |
| 2008/0256105 A1 | 10/2008 | Nogawa et al. |
| 2008/0263354 A1 | 10/2008 | Beuque |
| 2008/0279535 A1 | 11/2008 | Hague et al. |
| 2008/0294453 A1 | 11/2008 | Baird-Smith et al. |
| 2008/0294691 A1 | 11/2008 | Chang et al. |
| 2008/0298358 A1 | 12/2008 | John et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1* | 5/2009 | Soroushian et al. ......... 709/231 |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0168795 A1 | 7/2009 | Segel et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |

(56) References Cited

U.S. PATENT DOCUMENTS

| | | |
|---|---|---|
| 2011/0016225 A1 | 1/2011 | Park |
| 2011/0047209 A1 | 2/2011 | Lindholm et al. |
| 2011/0055585 A1 | 3/2011 | Lee |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon et al. |
| 2012/0005368 A1 | 1/2012 | Knittle et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0093214 A1 | 4/2012 | Urbach |
| 2012/0114302 A1 | 5/2012 | Randall et al. |
| 2012/0124191 A1 | 5/2012 | Lyon |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0166633 A1 | 6/2012 | Baumback et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma |
| 2012/0254455 A1 | 10/2012 | Adimatyam et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2013/0007223 A1 | 1/2013 | Luby et al. |
| 2013/0013730 A1 | 1/2013 | Li et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf et al. |
| 2013/0046902 A1 | 2/2013 | Villegas Nuñez et al. |
| 2013/0051554 A1 | 2/2013 | Braness |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1* | 3/2013 | Singla ............... G06F 11/1448 707/679 |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0128962 A1 | 5/2013 | Rajagopalan et al. |
| 2013/0152767 A1 | 6/2013 | Katz et al. |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227122 A1 | 8/2013 | Gao |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0037620 A1 | 2/2014 | Ferree et al. |
| 2014/0052823 A1* | 2/2014 | Gavade et al. ............... 709/219 |
| 2014/0059156 A1 | 2/2014 | Freeman, II et al. |
| 2014/0101722 A1 | 4/2014 | Moore |
| 2014/0115650 A1* | 4/2014 | Zhang ............... H04L 65/1069 725/116 |
| 2014/0119432 A1 | 5/2014 | Wang et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0250473 A1 | 9/2014 | Braness et al. |
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0026677 A1 | 1/2015 | Stevens et al. |
| 2015/0049957 A1 | 2/2015 | Shoham et al. |
| 2015/0063693 A1 | 3/2015 | Carmel et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |

(56) References Cited

U.S. PATENT DOCUMENTS

| | | |
|---|---|---|
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0334435 A1 | 11/2015 | Shivadas et al. |
| 2015/0373421 A1 | 12/2015 | Chan |
| 2016/0070890 A1 | 3/2016 | Grab et al. |
| 2016/0112382 A1 | 4/2016 | Kiefer et al. |
| 2016/0149981 A1 | 5/2016 | Shivadas et al. |
| 2016/0219303 A1 | 7/2016 | Braness et al. |
| 2017/0214947 A1 | 7/2017 | Kiefer et al. |

FOREIGN PATENT DOCUMENTS

| | | |
|---|---|---|
| CN | 1723696 | 1/2006 |
| EP | 757484 A2 | 2/1997 |
| EP | 813167 A2 | 12/1997 |
| EP | 0936812 A1 | 8/1999 |
| EP | 1056273 A2 | 11/2000 |
| EP | 1420580 A1 | 5/2004 |
| EP | 1553779 A1 | 7/2005 |
| EP | 1657835 A1 | 5/2006 |
| EP | 1718074 A1 | 11/2006 |
| EP | 2486517 | 8/2012 |
| EP | 2486727 | 8/2012 |
| EP | 2507995 A1 | 10/2012 |
| EP | 2564354 | 3/2013 |
| EP | 2616991 | 7/2013 |
| EP | 2617192 | 7/2013 |
| EP | 2564354 A4 | 3/2014 |
| EP | 2716048 | 4/2014 |
| EP | 2721826 | 4/2014 |
| EP | 2751990 | 7/2014 |
| EP | 2807821 | 12/2014 |
| JP | 08046902 A | 2/1996 |
| JP | 8111842 A | 4/1996 |
| JP | 1996163488 | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |
| JP | 2000201343 A | 7/2000 |
| JP | 02001043668 A | 2/2001 |
| JP | 2001346165 A | 12/2001 |
| JP | 2002170363 | 6/2002 |
| JP | 2002170363 A | 6/2002 |
| JP | 2002518898 A | 6/2002 |
| JP | 2002218384 A | 8/2002 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2005027153 A | 1/2005 |
| JP | 2005080204 A | 3/2005 |
| JP | 2006524007 A | 10/2006 |
| JP | 2007036666 A | 2/2007 |
| JP | 2007174375 A | 7/2007 |
| JP | 2007235690 A | 9/2007 |
| JP | 2007535881 A | 12/2007 |
| JP | 2008235999 A | 10/2008 |
| JP | 2014506430 A | 3/2014 |
| KR | 10-0221423 | 6/1999 |
| KR | 100221423 B1 | 6/1999 |
| KR | 2002013664 | 2/2002 |
| KR | 1020020064888 A | 8/2002 |
| KR | 669616 | 9/2007 |
| WO | 9515660 A1 | 6/1995 |
| WO | 9613121 | 5/1996 |
| WO | 1996013121 | 5/1996 |
| WO | 9731445 A3 | 4/1998 |
| WO | 9910836 A1 | 3/1999 |
| WO | 9965239 A2 | 12/1999 |
| WO | 0131497 A1 | 5/2001 |
| WO | 0150732 A2 | 7/2001 |
| WO | 0165762 A2 | 9/2001 |
| WO | 0201880 A1 | 1/2002 |
| WO | 0208948 A2 | 1/2002 |
| WO | 0235832 A2 | 5/2002 |
| WO | 0237210 A2 | 5/2002 |
| WO | 02054196 A2 | 7/2002 |
| WO | 2004054247 A1 | 6/2004 |
| WO | 2004097811 A1 | 11/2004 |
| WO | 2004102571 A1 | 11/2004 |
| WO | 2006018843 A2 | 2/2006 |
| WO | 2006018843 A3 | 12/2006 |
| WO | 2007044590 A2 | 4/2007 |
| WO | 2007113836 A2 | 10/2007 |
| WO | 2008010275 A1 | 1/2008 |
| WO | 2008042242 A2 | 4/2008 |
| WO | 2007113836 A3 | 11/2008 |
| WO | 2008135932 A2 | 11/2008 |
| WO | 2007113836 A3 | 12/2008 |
| WO | 2009065137 A1 | 5/2009 |
| WO | 2010060106 A1 | 5/2010 |
| WO | 2010080911 A1 | 7/2010 |
| WO | 2010089962 A1 | 8/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 2012094181 A2 | 7/2012 |
| WO | 2012094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013103986 A2 | 7/2013 |
| WO | 2013111126 A2 | 8/2013 |
| WO | 2013111126 A3 | 8/2013 |
| WO | 2013032518 A3 | 9/2013 |
| WO | 2013144942 A1 | 10/2013 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |

OTHER PUBLICATIONS

Author Unknown, "When is 54 Not Equal to 54? A Look at 802.11a, b and g Throughput", printed Oct. 30, 2008 from www.oreillynet.com/pub/a/wireless/2003/08/08/wireless_throughput.html, 4 pgs.

Author Unknown, "White paper, The New Mainstream Wirless LAN Standard", Broadcom Corporation, Jul. 2003, 12 pgs.

Blasiak, "Video Transrating and Transcoding: Overview of Video Transrating and Transcoding Technologies,", Ingenient Technologies, TI Developer Conference, Aug. 6-8, 2002, 22 pgs.

Casares et al., "Simplifying Video Editing Using Metadata", DIS2002, pp. 157-166.

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.

Gannes, "The Lowdown on Apple's HTTP Adaptive Bitrate Streaming", GigaOM, Jun. 10, 2009, 12 pgs.

Garg et al., "An Experimental Study of Throughput for UDP and VoIP Traffic in IEEE 802.11b Networks", Wireless Communications and Networkings, Mar. 2003, pp. 1748-1753.

Ghosh, "Enhancing Silverlight Video Experiences with Contextual Data", Retrieved from: http://msdn.microsoft.com/en-us/magazine/ee336025.aspx, 15 pgs.

(56) References Cited

OTHER PUBLICATIONS

Inlet Technologies, "Adaptive Delivery to iDevices", 2 pages.
Inlet Technologies, "Adaptive delivery to iPhone 3.0", 2 pgs.
Inlet Technologies, "HTTP versus RTMP", 3 pages.
Inlet Technologies, "The World's First Live Smooth Streaming Event: The French Open", 2 pages.
Kaspar et al., "Using HTTP Pipelining to Improve Progressive Download over Multiple Heterogeneous Interfaces", IEEE ICC proceedings, 2010, 5 pgs.
Kim, "MPEG-2 ES/PES/TS/PSI", Kyung-Hee University,Oct. 4, 2010, 66 pgs.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
Long et al., "Silver: Simplifying Video Editing with Metadata", Demonstrations, CHI 2003: New Horizons, pp. 628-629.
Msdn, "Adaptive streaming, Expression Studio 2.0", 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Nelson, "IBM's Cryptolopes", Complex Objects in Digital Libraries Course, Spring 2001, Retrieved from http://www.cs.odu.edu/~min/teaching/unc/inls210/?,method=display&pkg_name=cryptolopes.pkg&element_name=cryptolopes.ppt, 12 pgs.
Noboru, "Play Fast and Fine Video on Web! codec", Co.9 No. 1212/01/2003, 178-179.
Noe, "Matroska File Format (under construction!)", Retrieved from the Internet: URL:http://web.archive.org web/20070821155146/www.matroska.org/technical/specs/matroska.pdf [retrieved on Jan. 19, 2011]Jun. 24, 2007, 1-51.
Noe, "AVI File Format", http://www.alexander-noe.com/video/documentation/avi.pdf, pp. 1-26.
Noe, "Definitions", http://www.alexander-noe.com/video/amg/definitions.html, Apr. 11, 2006.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, "HTTP Live Streaming: draft-pantos-http-live-streaming-06", Published by the Internet Engineering Task Force (IETF)Mar. 31, 2011, 24 pages.
Papagiannaki et al., "Experimental Characterization of Home Wireless Networks and Design Implications", INFOCOM 2006, 25th IEEE International Conference of Computer Communications, ProceedingsApr. 2006, 13 pgs.
Phamdo, "Theory of Data Compression", printed from http://www.data-compression.com/theoroy.html on Oct. 10, 2003, 12 pgs.
Rgb Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne et al., "Real Time Streaming Protocol 2.0 (RTSP): draft-ietfmmusic-rfc2326bis-27", MMUSIC Working Group of the Internet Engineering Task Force (IETF)Mar. 9, 2011, 296 pages (presented in two parts).
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Tan et al., "Video transcoding for fast forward/reverse video playback"IEEE ICIP, 2002, pp. I-713 to I-716.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Wang et al., "Image Quality Assessment: From Error Visibility to Structural Similarity", IEEE Transactions on Image Processing, Apr. 2004, vol. 13, No. 4, pp. 600-612.
Wu et al., "Next Generation Mobile Multimedia Communications: Media Codec and Media Transport Perspectives", In China CommunicationsOct. 2006, pp. 30-44.
Zambelli, "IIS Smooth Streaming Technical Overview", , Microsoft Corporation, Mar. 2009.
Extended European Search Report for European Application EP10821672, completed Jan. 30, 2014, 3 pgs.
Extended European Search Report for European Application EP11824682, completed Feb. 6, 2014, 4 pgs.
International Preliminary Report on Patentability for International Application No. PCT/US2008/083816, dated May 18, 2010, 6 pgs.
International Search Report and Written Opinion for International Application No. PCT/US2004/041667, Completed May 24, 2007, dated Jun. 20, 2007, 6 pgs.
International Search Report and Written Opinion for International Application No. PCT/US2005/025845, completed Feb. 5, 2007 and dated May 10, 2007, 8 pgs.
International Search Report and Written Opinion for International Application No. PCT/US2010/020372, Completed Feb. 10, 2009, dated Mar. 1, 2010, 8 pgs.
Office Action for Chinese Patent Application No. CN200880127596.4, dated May 6, 2014, 15 pgs.
Office Action for U.S. Appl. No. 13/224,298, dated May 19, 2014, 27 pgs.
Office Action for U.S. Appl. No. 13/905,804, dated Jul. 25, 2014, 14 pgs.
Office Action for U.S. Appl. No. 14/564,003, dated Apr. 17, 2015, 28 pgs.
Office Action for U.S. Appl. No. 13/223,210, dated Apr. 30, 2015, 14 pgs.
Supplementary European Search Report for European Application EP11774529, completed Jan. 31, 2014, 2 pgs.
Written Opinion for International Application No. PCT/US2007/063950, completed Mar. 1, 2008, dated Mar. 19, 2008, 6 pgs.
Written Opinion for International Application No. PCT/US2008/083816, completed Jan. 10, 2009, dated Jan. 22, 2009, 5 pgs.
Written Opinion for International Application No. PCT/US2008/087999, completed Feb. 7, 2009, dated Mar. 19, 2009, 4 pgs.
Written Opinion for International Application No. PCT/US2009/046588, completed Jul. 14, 2009, dated Jul. 23, 2009, 5 pgs.
Invitation to Pay Additional Fees for International Application PCT/US2014/039852, dated Sep. 25, 2014, 2 pgs.
"DVD—MPeg differences", printed Jul. 2, 2009 from http://dvd.sourceforge.net/dvdinfo/dvdmpeg.html, 1 pg.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
Long et al., "Silver: Simplifying Video Editing with Metadata," CHI 2003: New Horizons, Apr. 5-10, 2003, pp. 628-629.
Unknown, "MPEG-4 Video Encoder: Based on International Standard ISO/IEC 14496-2", Patni Computer Systems, Ltd., publication date unknown, 15 pgs.

(56) References Cited

OTHER PUBLICATIONS

"IBM Closes Cryptolopes Unit," Dec. 17, 1997, CNET News, Retrieved from http://news.cnet.com/IBM-closes-Cryptolopes-unit/2100-1001_3206465.html, 3 pages.
"Information Technology-Coding of Audio Visual Objects—Part 2: Visual" International Standard, ISO/IEC 14496-2, Third Edition, Jun. 1, 2004, pp. 1-724 (presented in three parts).
"OpenDML AVI File Format Extensions," Sep. 1997, Version 1.02, XP-002179318, OpenDML AVI M-JPEG File Format Subcommitee, 29 pgs.
Broadq—The Ultimate Home Entertainment Software, printed May 11, 2009 from ittp://web.srchive.org/web/20030401122010/www.broadq.com/qcasttuner/, 1 pg.
Cloakware Corporation, "Protecting Digital Content Using Cloakware Code Transformation Technology", Version 1.2, May 2002, pp. 1-10.
European Search Report Application No. EP 08870152, Search Completed May 19, 2011, dated May 26, 2011, 10 pgs.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Federal Computer Week, "Tool Speeds Info to Vehicles", Jul. 25, 1999, 5 pages.
Griffith, Wi-Fi Planet, The Wireless Digital Picture Frame Arrives, printed May 4, 2007 from http://www.wi-fiplanet.com/news/article.php/3093141, 3 pgs.
HTTP Live Streaming Overview, Networking & Internet, Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
Informationweek: Front End: Daily Dose, "Internet on Wheels", Jul. 20, 1999, 3 pgs.
International Preliminary Report on Patentability for International Application PCT/US14/30747, Report Issued Sep. 15, 2015, dated Sep. 24, 2015, 6 Pgs.
International Preliminary Report on Patentability for International Application No. PCT/US2011/068276, International Filing Date Dec. 31, 2011, dated Mar. 4, 2014, 23 pgs.
International Preliminary Report on Patentability for International Application PCT/US2013/043181, Report issued Dec. 31, 2014, dated Jan. 8, 2015, 11 Pgs.
International Preliminary Report on Patentability for International Application PCT/US2014/039852 , Report issued Dec. 1, 2015, dated Dec. 5, 2015, 8 Pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 14, 2009, dated Jul. 23, 2009, 7 pgs.
International Search Report and Written Opinion for International Application No. PCT/US2004/041667, Completed Jun. 20, 2007, 6 pgs.
International Search Report and Written Opinion for International Application No. PCT/US2007/063950completed Feb. 19, 2008, dated Mar. 19, 2008, 9 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/56733, completed Jan. 3, 2011, dated Jan. 14, 2011, 6 pgs.
International Search Report and Written Opinion for International Application No. PCT/US2013/043181 Completed Nov. 27, 2013, dated Dec. 6, 2013, 12 pgs.
International Search Report and Written Opinion for International Application PCT/US14/39852, Completed Oct. 21, 2014, dated Dec. 5, 2014, 11 pgs.
International Search Report and Written Opinion for International Application PCT/US2011/066927, Completed Apr. 3, 2012, dated Apr. 20, 2012, 14 pgs.
International Search Report and Written Opinion for International Application PCT/US2011/067167, Completed Jun. 19, 2012, dated Jul. 2, 2012, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, Completed Mar. 19, 2013, dated Apr. 29, 2013, 10 pgs.
ITS International, "Fleet System Opts for Mobile Server", Aug. 26, 1999, 1 page.
KISS DP-500 from http://www.kiss-technology.com/?p=dp500, 10 KISS Players, 1 pg.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.
Microsoft Corporation, "Chapter 8, Multimedia File Formats" 1991, Microsoft Windows Multimedia Programmer's Reference, 3 cover pgs., pp. 8-1 to 8-20.
Microsoft Windows® XP Media Center Edition 2005, Frequently asked Questions, printed May 4, 2007 from http://www.microsoft.com/windowsxp/mediacenter/evaluation/faq.mspx.
Microsoft Windows® XP Media Center Edition 2005: Features, printed May 9, 2007, from http://www.microsoft.com/windowsxp/mediacenter/evaluation/features.mspx, 4 pgs.
Microsoft, Microsoft Media Platform: Player Framework, "Silverlight Media Framework v1.1", 2 pgs.
Microsoft, Microsoft Media Platform:Player Framework, "Microsoft Media Platform: Player Framework v2.5 (formerly Silverlight Media Framework)", 2 pgs.
Morrison, "EA IFF 85" Standard for Interchange Format Files, Jan. 14, 1985, printed from http://www.dcs.ed.ac.uk/home/mxr/gfx/2d/IFF.txt on Mar. 6, 2006, 24 pgs.
Open DML AVI-M-JPEG File Format Subcommittee, "Open DML AVI File Format Extensions", Version 1.02, Feb. 28, 1996, 29 pgs.
PC World.Com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/en/about.php,1 pg.
Search Report and Written Opinion for International Application No. PCT/US2005/025845, completed Feb. 5, 2007 and dated May 10, 2007, 6 pgs.
Supplementary European Search Report for Application No. EP 04813918, Search Completed Dec. 19, 2002, 3 pgs.
Supplementary European Search Report for Application No. EP 10729513, Search Completed Dec. 9, 2013, 4 pgs.
Taxan, A Vel LinkPlayer2 for Consumer, I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.
The Official Microsoft IIS Site, Smooth Streaming Client, 4 pgs.
Windows Media Center Extender for Xbox, printed May 9, 2007 from http://www.xbox.com/en-US/support/systemuse/xbox/console/mediacenterextender.htm, 2 pgs.

(56) References Cited

OTHER PUBLICATIONS

Windows® XP Media Center Edition 2005 from http://download.microsoft.com/download/c/9/a/c9a7000a-66b3-455b-860b-1c16f2eecfec/MCE.pdf, 2 pgs.
International Search Report and Written Opinion for International Application PCT/US14/30747, completed Jul. 30, 2014, dated Aug. 22, 2014, 7 Pgs.
I-O Data, Innovation of technology arrived, from http://www.iodata.com/catalogs/AVLP2DVDLA_Flyer200505.pdf, 2 pgs.
"Adaptive Streaming Comparison", Jan. 28, 2010, 5 pgs.
"Best Practices for Multi-Device Transcoding", Kaltura Open Source Video, 13 pgs.
"Container format (digital)", printed Aug. 22, 2009 from http://en.wikipedia.org/wiki/Container_format_(digital), 4 pgs.
"Diagram I Matroska", Retrieved from the Internet: URL:http://web.archive.org/web/201 01217114656/http:I/matroska.org/technical/diagram/index.html, [retrieved on Jan. 29, 2016]Dec. 17, 2010.
"DVD subtitles", sam.zoy.org/writings/dvd/subtitles, dated Jan. 9, 2001, printed Jul. 2, 2009, 4 pgs.
"DVD-Mpeg differences", http://dvd.sourceforge.net/dvdinfo/dvdmpeg.html, printed on Jul. 2, 2009, 1 pg.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Retrieved from http://www.thefreelibrary.com/IBM+Spearheading+Intellectual+Property+Protection+Technology+for...-a018239381, 6pg.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"International Search Report and Written Opinion for International Application PCT/US2010/020372", Report dated Mar. 1, 2010, 7 pgs.
"Matroska Streaming | Matroska", Retrieved from the Internet: URL:http://web.archive.org/web/201 0121711431 O/http://matroska.org/technical!streaming/index.html, [retrieved on Jan. 29, 2016]Dec. 17, 2010.
"Netflix turns on subtitles for PC, Mac streaming", 3 pgs.
"QCast Tuner for PS2, printed May 11, 2009 from http://web.archive.org/web/20030210120605/www.divx.com/software/detail.php? ie=39, 2 pgs".
"Specifications | Matroska", Retrieved from the Internet: URL:http://web.archive.org/web/201 00706041303/http:/1www.matroska.org/technical/specs/index.html, [retrieved on Jan. 29, 2016Jul. 6, 2010.
"Supplementary European Search Report for Application No. EP 10834935, International Filing Date Nov. 15, 2010, Search Completed May 27, 2014, 9 pgs."
"Supported Media Formats", Supported Media Formats, Android Developers, Nov. 27, 2013, 3 pgs.
"Thread: SSME (Smooth Streaming Medial Element) config.xml review (Smooth Streaming Client configuration file)", 3 pgs.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/concep tual/streamingmediaguide/UsingHTTPLiveStreaming/UsingHTTPLiveStreaming. html#//apple_ref/do/uid/TP40008332-CH102-SW1, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
Akhshabi et al., "An Experimental Evaluation of Rate-Adaptation Algorithms in Adaptive Streaming over HTTP", MMSys'11, Feb. 24-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., Publication date unknown, 15 pgs.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown) 6 pages.

\* cited by examiner

```
<?xml version="1.0" encoding="utf-8"?>
<smil xmlns="http://www.w3.org/ns/SMIL" version="3.0" baseProfile="Tiny">
<head />
<body>
<seq>
<excl>
<video src="file://sdcard/Cluster_0_v0.ebml" clipBegin ="0" clipEnd ="2">
  <param name="mediaSize" value="3200" valuetype="data" />
</video>
<video src="file://sdcard/Cluster_1_v1.ebml" clipBegin="2" clipEnd="4">
  <param name="mediaSize" value="2354" valuetype="data" />
</video>
<video src="file://sdcard/Cluster_2_v1.ebml" clipBegin="4" clipEnd="6">
  <param name="mediaSize" value="3750" valuetype="data" />
</video>
<video src="file://sdcard/Cluster_3_v0.ebml" clipBegin="6" clipEnd="8">
  <param name="mediaSize" value="4521" valuetype="data" />
</video>
<video src="file://sdcard/Cluster_4_v0.ebml" clipBegin="8" clipEnd="10">
  <param name="mediaSize" value="4521" valuetype="data" />
...
```

FIG. 6

SYSTEMS, METHODS, AND MEDIA FOR STREAMING MEDIA CONTENT

TECHNICAL FIELDS

Methods, systems, and media for streaming media content are provided. More particularly, the disclosed subject matter relates to adaptive bitrate streaming.

BACKGROUND OF THE INVENTION

There are many conventional approaches to streaming media content, such as television programs, pay-per-view programs, on-demand programs, Internet content, movies, etc. For example, media content can be encoded at multiple bit rates. The encoded media content can then be transmitted using a suitable protocol, such as the Hypertext Transfer Protocol (HTTP), the Real-time Transport Protocol (RTP), the Real Time Streaming Protocol (RTSP), etc. However, conventional approaches do not provide users with the capabilities to stream, store, and playback media content at variable bitrates.

Accordingly, new mechanisms for streaming media content are desirable.

SUMMARY OF THE INVENTION

In view of the foregoing, systems, methods, and media for streaming media content are provided.

In some embodiments, methods for streaming media content are provided, the methods comprising: receiving top level index data from a server; caching the top level index data in an index file; receiving header data associated with a first media content file from the server; caching the header data in a header file; receiving a first segment of the first media content file based at least in part on the index file; caching the first segment of the first media content file in a first file; updating the index file to include information about the first file; and causing the first fragment to be displayed based at least in part on the index file and the header file.

In some embodiments, systems for streaming media content are provided, the systems comprising at least one hardware processor that is configured to: receive top level index data from a server; cache the top level index data in an index file; receive header data associated with a first media content file from the server; cache the header data in a header file; receive a first segment of the first media content file based at least in part on the index file; cache the first segment of the first media content file in a first file; update the index file to include information about the first file; and cause the first fragment to be displayed based at least in part on the index file and the header file.

In some embodiments, non-transitory media containing computer-executable instructions that, when executed by a hardware processor, cause the hardware processor to streaming media content are provided, the method comprising: receiving top level index data from a server; caching the top level index data in an index file; receiving header data associated with a first media content file from the server; caching the header data in a header file; receiving a first segment of the first media content file based at least in part on the index file; caching the first segment of the first media content file in a first file; updating the index file to include information about the first file; and causing the first fragment to be displayed based at least in part on the index file and the header file.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 shows an example of a top level index file in accordance with some embodiments of the invention.

DETAILED DESCRIPTION OF EMBODIMENTS

Figure 1:
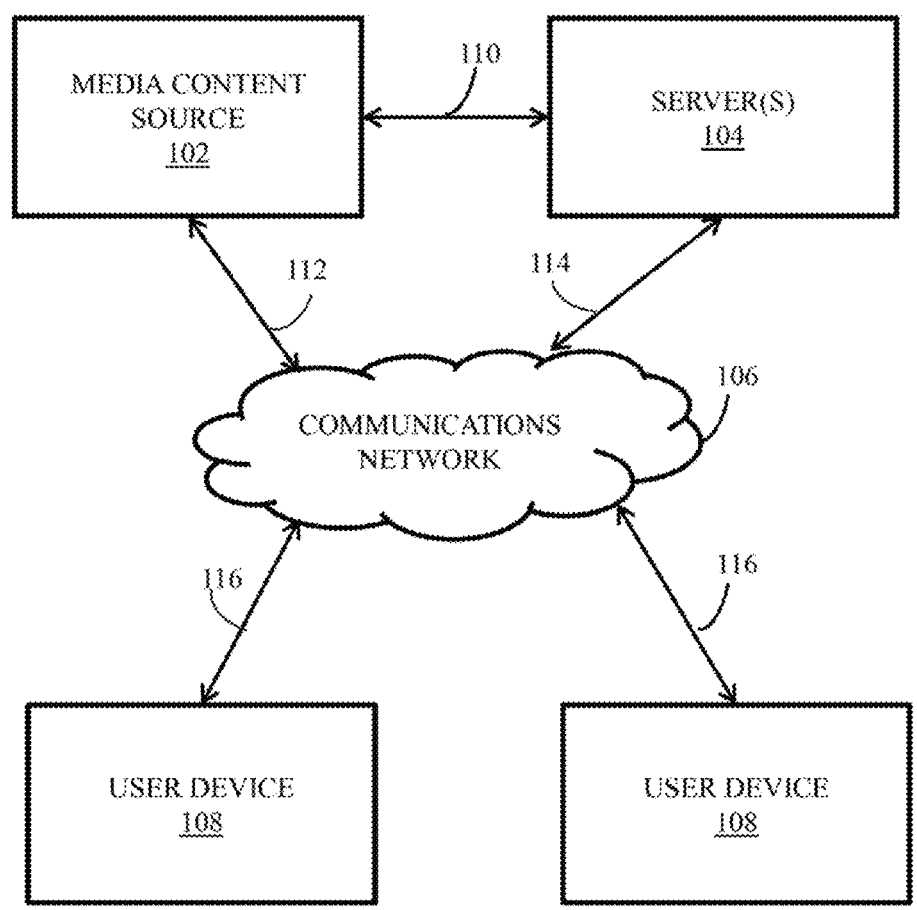
FIG. 1 shows a generalized block diagram of an example of an architecture of hardware that can be used to stream media content in accordance with some embodiments of the invention.

This invention generally relates to mechanisms (which can be systems, methods, media, etc.) for streaming media content. The mechanisms can be used in many applications. For example, the mechanisms can be used to stream, store, and/or playback media content having different versions (e.g., such as video content encoded at multiple bit rates, resolutions, frame rates, etc.).

In some embodiments, media content (e.g., such as video content, audio content, subtitles, etc.) can be stored in one or more Matroska container files on a server. The Matroska container is a media container developed as an open standard project by the Matroska non-profit organization of Aussonne, France. The Matroska specification (which can be retrieved from the Internet: http://matroska.org/technical/specs/index.html) is hereby incorporated by reference herein in its entity. In some embodiments, for example, the server can store multiple Matroska container files containing encoded video content having different bit rates, resolutions, frame rates, etc.

In some embodiments, a user device can request a top level index file from the server. For example, the user device can send one or more requests containing information relating to resources that can provide the top level index file under a suitable protocol (e.g., such as a Hypertext Transfer Protocol (HTTP), a Transmission Control Protocol (TCP), etc.). In a more particular example, the user device can request the top level index file via one or more HTTP requests containing one or more Uniform Resource Identifiers (URI) associated with the top level index file.

In some embodiments, the user device can receive the requested top level index file via one or more responses sent by the server. In the example where multiple HTTP requests are used to request the top level index file, the top level index file can be received via one or more HTTP responses corresponding to the HTTP requests. In some embodiments, the top level index file can be received in any suitable format. For example, the top level index file can be received as a Synchronized Multimedia Integration Language (SMIL) file, an Extensible Markup Language (XML) file, etc.

In some embodiments, upon receiving the top level index file, the user device can cache the top level index file in a suitable manner. For example, the top level index file can be cached in the form of one or more SMIL files, XML files, etc.

In some embodiments, the user device can request one or more headers associated with one or more Matroska container files based on the cached top level index file. For example, the user device can parse the cached top level index file and obtain one or more URIs corresponding to the headers. The user device can then request the headers by sending one or more requests containing the URIs to the server and/or another server.

In some embodiments, the user device can receive the requested headers through one or more responses that are sent by the server in response to the requests. In some embodiments, the user device can also cache the received headers in a suitable manner. For example, each of the headers can be cached as an Extensible Binary Meta Language (EBML) file.

In some embodiments, the user device can request one or more media content fragments from the server. For example, the user device can request one or more cluster elements of one or more Matroska container files stored on the server. In a more particular example, the user device can request a cluster element of a Matroska container file (e.g., a video file containing suitable video data) based on the streaming conditions (e.g., such as the bandwidth, the hardware capacity, etc. that can be utilized to stream media content) that is experienced by the user device.

In some embodiments, upon receiving the requested media content fragments from the server, the user device can cache the media content fragments. For example, the user device can cache each media content fragment in an EBML file upon receiving the media content fragment. In some embodiments, the user device can also update the cached top level index file to include information about the cached media content fragments. For example the cached top level index file can be updated to include one or more URIs corresponding to each EBML file that stores the cached media content fragment.

In some embodiments, after one or more media content fragments are cached (e.g., in multiple EBML files, respectively), the user device can cause the cached media content to be rendered. For example, the user device can cause cached video content, audio content, subtitles, etc. to be rendered based on the cached top level index file, the cached headers, and/or any other suitable information. In a more particular example, the user device can retrieve multiple EBML files that store the cached media content fragments based on the top level index file (e.g., using the URIs corresponding to each EBML file). The user device can then extract the media content stored in the EBML files, decode the media content, and cause the decoded media content to be rendered.

In some embodiments, the cached media content can be rendered at any suitable time. For example, the cached media content can be rendered when the user device is streaming and/or downloading media content from the server. As another example, the cached media content can be rendered after the user device has finished streaming and/or caching media content from the server. In a more particular example, the user device can cause the cached media content to be rendered in response a user requesting a playback of part or all of the cached media content at any time with or without a live communication connection with the server.

Turning to FIG. 1, a generalized block diagram of an example 100 of an architecture of hardware that can be used to stream media content in accordance with some embodiments is shown. As illustrated, architecture 100 can include a media content source 102, one or more servers 104, a communications network 106, one or more user devices 108, and communications paths 110, 112, 114, and 116.

Media content source 102 can include any suitable device that can provide media content. For example, media content source 102 can include any suitable circuitry that is capable of encoding media content, such as one or more suitable video encoders, audio encoders, video decoders, audio decoders, etc. In a more particular example, media content source 102 can include one or more suitable video encoders that are capable of encoding video content into different versions, each of which can have a particular bit rate, a particular resolution, a particular frame rate, a particular bit depth, etc.

As another example, media content source 102 can include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, and/or any other suitable media content provider equipment. NBC is a trademark owned by the National Broadcasting Company, Inc., ABC is a trademark owned by the ABC, INC., and HBO is a trademark owned by the Home Box Office, Inc.

Media content source 102 may be operated by the originator of content (e.g., a television broadcaster, a Webcast provider, etc.) or may be operated by a party other than the originator of content (e.g., an on-demand content provider, an Internet provider of content of broadcast programs for downloading, etc.).

Media content source 102 may be operated by cable providers, satellite providers, on-demand providers, Internet providers, providers of over-the-top content, and/or any other suitable provider(s) of content.

Media content source 102 may include a remote media server used to store different types of content (including video content selected by a user) in a location remote from any of the user equipment devices. For example, media content source 102 can include one or more content delivery networks (CDN).

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

Server(s) 104 can be and/or include any suitable device that is capable of receiving, storing, processing, and/or delivering media content, and/or communicating with one or more user devices and/or other components of architecture 100 under one or more suitable protocols. For example, server(s) 104 can include any suitable circuitry that can receive requests, process requests, send responses, and/or perform other functions under a Hypertext Transfer Protocol (HTTP), a Transmission Control Protocol (TCP), etc.

In some embodiments, server(s) 104 can store media content that can be delivered to one or more components of architecture 100 in a suitable manner. For example, the media content can be stored in one or more suitable multimedia containers, such as Matroska media containers, Audio Video Interleaved (AVI) media containers, MPEG-4 Part 14 (MP4) media containers, etc.

Figure 2:
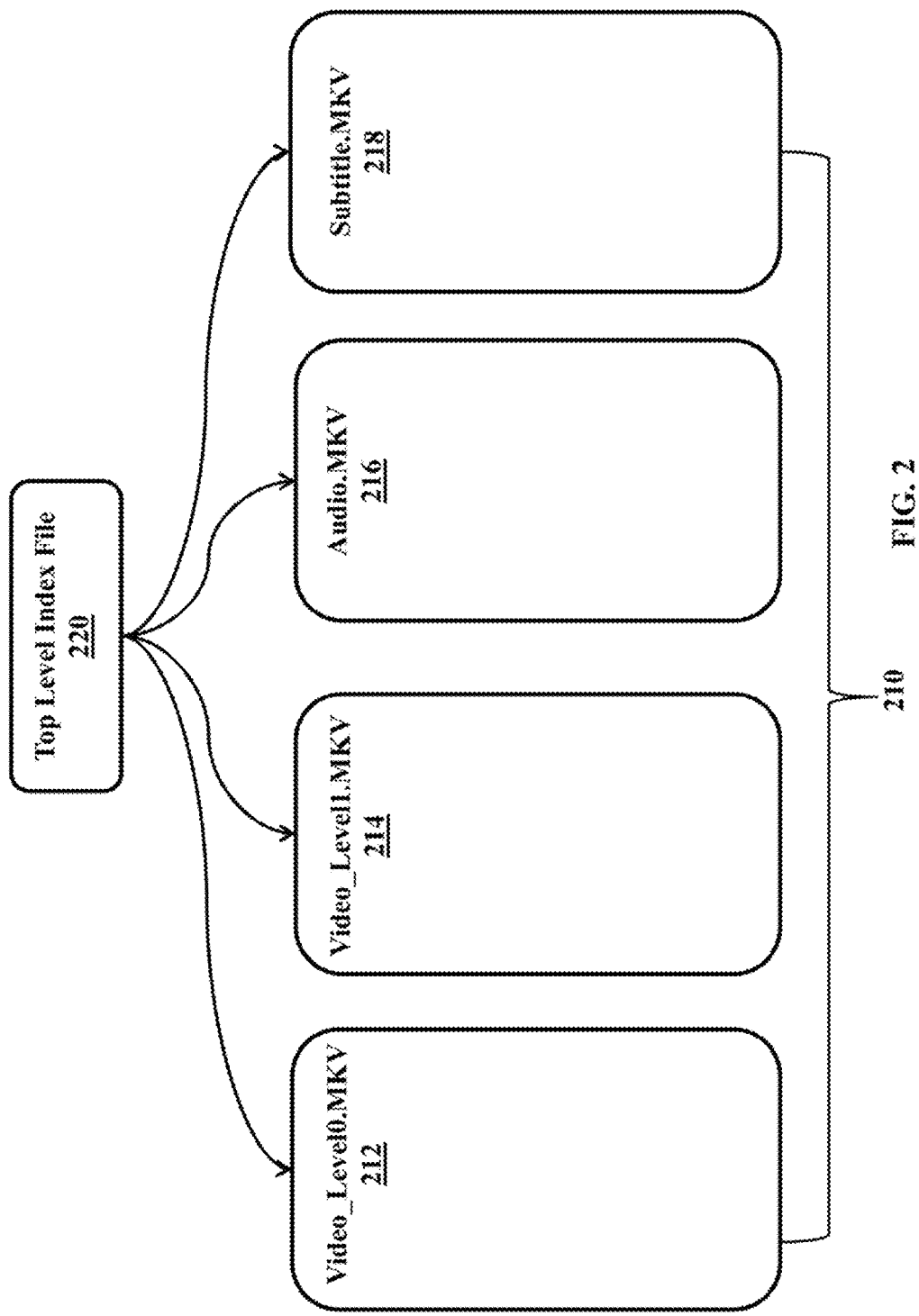
FIG. 2 shows examples of a top level index file and Matroska container files in accordance with some embodiments of the invention.

In a more particular example, as illustrated in FIG. 2, server(s) 104 can store one or more Matroska container files 210 and one or more top level index file 220.

Matroska container files 210 can include any suitable files containing data about suitable media content, such as video content, audio content, subtitles, etc. For example, Matroska container files 210 can include one or more MKV files that can include data about video content, audio content, subtitles, etc. As another example, Matroska container files 210 can include one or more MKA files that can include audio data. As yet another example, Matroska container files 210 can include one or more MKS files that can include data about subtitles. As yet another example, Matroska container files 210 can include one or more MK3D files that can include data about stereoscopic video content.

In a more particular example, Matroska container files 210 can include one or more video files, such as video files 212 and 214 as illustrated in FIG. 2. In some embodiments, each of video files 212 and 214 can include data about video content having a particular bit rate, a particular resolution, a particular frame rate, etc. In some embodiments, each of video files 212 and 214 can contain a version of particular video content. More particularly, for example, video file 212 can contain a version of the particular video content including encoded video content having a first bit rate (and/or a first frame rate, a first resolution, etc.). Video file 214 can contain a version of the particular video content including encoded video content having a second bit rate (and/or a second frame rate, a second resolution, etc.).

Although two video files are shown in FIG. 2 to avoid over-complicating the drawing, any suitable number of these video files can be used in some embodiments. For example, Matroska container files 210 can include multiple video files (e.g., nine files or any suitable number of files), where each video file contains a version of particular video content (e.g., encoded video content having a particular bit rate, a particular resolution, a particular frame rate, etc.).

In another more particular example, Matroska container files 210 can include one or more audio files, such as an audio file 216. In some embodiments, audio file 216 can contain audio content that is associated with the video content contained in one or more video files, such as video files 212 and 214.

In yet another more particular example, Matroska container files 210 can include one or more files that contain subtitles associated with suitable video content and/or audio content, such as a subtitle file 218. In some embodiments, subtitle file 218 can contain data about subtitles that relate to the video content contained in video files 212 and 214 and/or the audio content contained in audio file 216.

Figure 3:
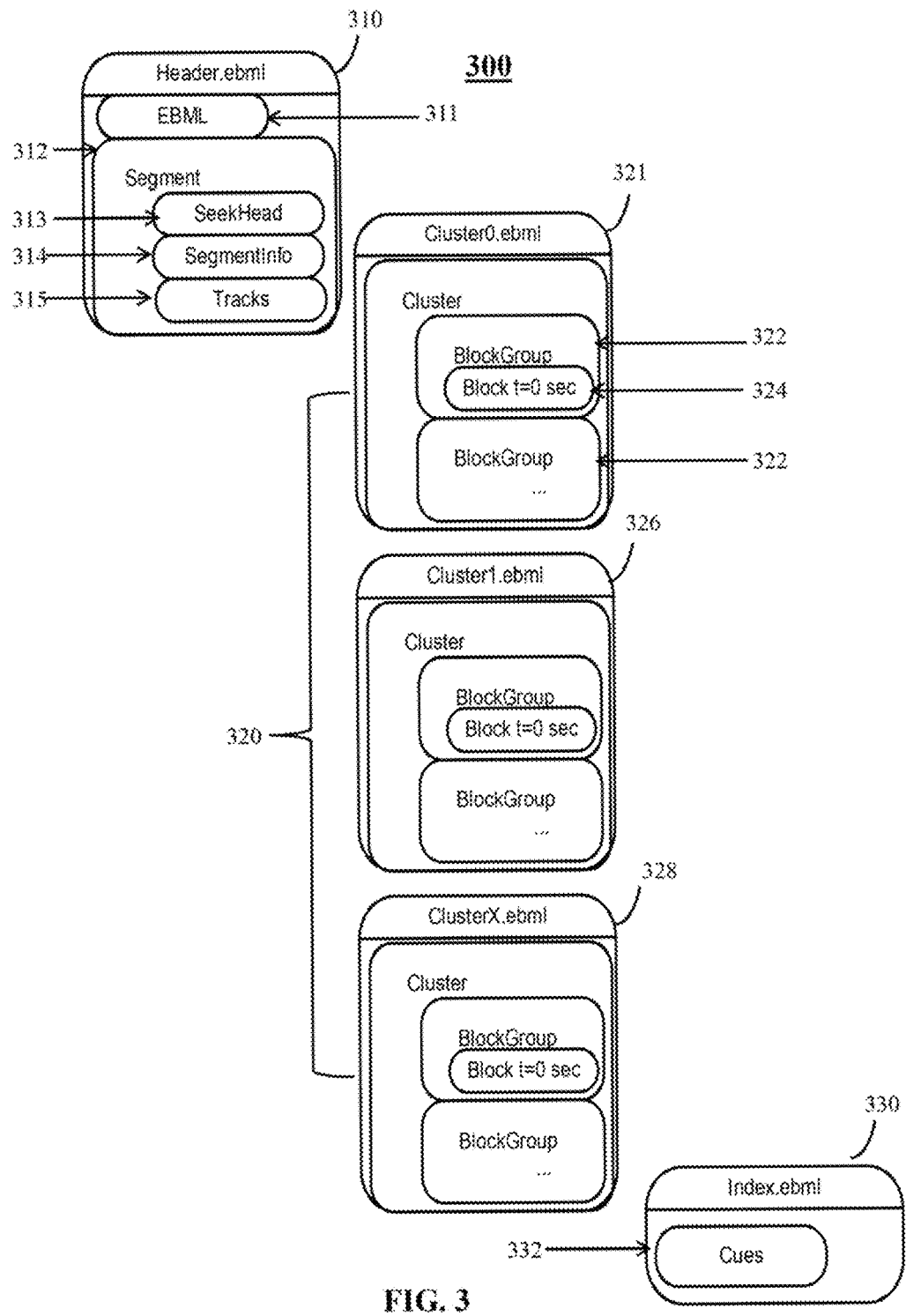
FIG. 3 shows an example of a structure of a Matroska container file in accordance with some embodiments of the invention.

In some embodiments, each of Matroska container files 210 can have a structure as illustrated in FIG. 3. As shown, Matroska container file 300 can include a header element 310, one or more cluster elements 320, an index element 330, and/or any other suitable components.

Header element 310 can include any suitable information relating to Matroska container file 300, such as a description of file 300, the version of file 300, etc. Header element 310 can also include any suitable information relating to the media content stored in file 300, such as the bit rate, the resolution, the frame rate, etc. of the media content.

In some embodiments, header element 310 can include an Extensible Binary Meta Language (EBML) element 311, one or more segment elements 312, and/or any other suitable components.

In some embodiments, EBML element 311 can include information about EBML version of the file, the type of EBML file (e.g., a Matroska file), etc.

Segment element 312 can contain any suitable data about media content, header, etc. In some embodiments, segment element 312 can include a seekhead element 313, a segmentinfo element 314, a tracks element 315, and/or any other suitable components.

In some embodiments, seekhead element 313 can include any suitable information about one or more components of segment element 312, such as a list of the positions of the components of segment element 312 (e.g., such as segmentinfo element 314, tracks element 315, etc.). Segmentinfo element 314 can include any suitable information about segment element 312 and/or file 300, such as the duration of the media content contained in segment element 312, an identification number corresponding to segment element 312 (e.g., a randomly generated unique number that can be used to identify segment element 312), a title of segment element 312 and/or file 300, etc. Tracks element 316 can include any suitable information about one or more media tracks that are stored in segment element 312, such as the type of each of the tracks (e.g., audio, video, subtitles, etc.), the codec used to generate each of the tracks, the resolution of video content, the frame rate of video content, the bit depth of video content, etc.

Cluster element 320 can contain any suitable information relating to media content, such as video content, audio content, subtitles, etc. For example, cluster element 320 can contain video data, audio data, or subtitles corresponding to media content having a particular duration (e.g., two seconds, or any suitable duration). As another example, cluster element 320 can also contain a timecode element that can indicate the start time of the media content contained in cluster element 320.

In a more particular example, cluster element 320 can include one or more blockgroup elements 322. Blockgroup element 322 can include any suitable information relating to a part of or all of the media content data contained in cluster element 320. For example, blockgroup element 322 can contain one or more block elements 324, each of which can contain a block of media content data (e.g., video data, audio data, subtitles, etc.) that can be rendered by a user device.

As another example, blockgroup element 322 can also contain any suitable information relating to the block of media content data, such as the start time of the media content, the duration of the media content, the type of media content data contained in blockgroup element 322 (e.g., video, audio, subtitles, etc.), etc. In a more particular example, blockgroup element 322 can include one or more suitable timecodes corresponding to the start time, the end time, the duration, and/or other suitable information of the media content contained in blockgroup element 322.

In some embodiments, file 300 can include multiple cluster elements 320 (e.g., cluster element 321, cluster element 326, . . . , and cluster element 328). In some embodiments, for example, each of the cluster elements can contain data about a portion of a piece of media content. In a more particular example, each cluster element can contain a portion of the piece of media content having the same duration (e.g., such as two seconds, or any other suitable duration). More particularly, for example, cluster elements 321 and 326 can contain data about a first portion of the piece of media content (e.g., the first two seconds of the media content), a second portion of the piece of media content (e.g., the second two seconds of the media content), respectively.

In some embodiments, multiple Matroska container files can contain cluster elements corresponding to the same portion of the piece of media content. For example, in the example where video file 212 and video file 214 (FIG. 2) contain different versions of the same source media content, the first cluster element of video file 212 (e.g., cluster element 321 of FIG. 3) and the first cluster element of video file 214 (e.g., cluster element 321 of FIG. 3) can contain different versions of the first portion of the piece of media content (e.g., encoded video content having different bit rates, resolutions, frame rates, etc.). In some embodiments, the first cluster element of audio file 216 and the first cluster element of subtitle file 218 can contain audio data and subtitles corresponding to the first portion of the media content.

Referring back to FIG. 3, index element 330 can include any suitable information relating to identifying one or more cluster elements 320 or any suitable portions of the cluster elements. For example, index element 330 can include one or more Cues elements 332 that can contain any suitable information that can be used to identify and/or seek one or more cluster elements, block elements, etc. In a more particular example, Cues element 332 can include one or more timecodes containing information about the duration, the start time, the end time, etc. of the media content contained in one or more cluster elements, block elements, video frames, etc. In another more particular example, cues element 332 can include a list of positions of multiple cluster elements, block elements, video frames, etc. More particularly, for example, the list of positions can include the positions of the cluster elements, block elements, video frames, etc. associated with a particular timecode.

Referring back to FIG. 2, top level index file 220 can be any suitable file containing any suitable information relating to one or more of Matroska container files 210. In some embodiments, for example, top level index file 220 can be a Synchronized Multimedia Integration Language (SMIL) file, an Extensible Markup Language (XML) file, a Hyper-Text Markup Language (HTML) file, etc.

In some embodiments, for example, top level index file 220 can include any suitable information concerning the media content contained in one or more of Matroska container files 210. In a more particular example, top level index file 220 can include information about the bit rates, frames rates, resolutions, etc. of the video content contained in video files 212 and 214.

In some embodiments, top level index file 220 can also include any suitable information that can be used to identify and/or seek one or more of Matroska container files 210 and/or any suitable portions of Matroska container files 210. For example, top level index file 220 can include information that can be used to identify one or more resources from which one or more of Matroska container files 210 can be obtained, such as the names of the resources, the locations of the resources, etc. In a more particular example, top level index file 220 can include one or more uniform resource identifiers (URIs) associated with one or more of Matroska container file 220 (e.g., such as video file 212, video file 214, audio file 216, subtitle file 218, etc.). In another more particular example, top level index file 210 can also include one or more URIs associated with one or more header elements, cluster elements, block elements, segment elements, index elements, etc. of one or more Matroska container files 210.

Referring back to FIG. 1, system 100 can also include one or more user devices 108. Each user device 108 can be any suitable device that is capable of receiving, processing, converting, and/or rendering media content, and/or performing any other suitable functions. For example, system 100 can include a desktop computer, a laptop computer, a tablet computer, a mobile phone, a television device, a set-top box, a streaming media player, a digital media receiver, a DVD player, a BLU-RAY player, a game console, etc., and/or any other suitable combination of the same.

In some embodiments, communications network 106 may be any one or more networks including the Internet, a mobile phone network, a mobile voice, a mobile data network (e.g., a 3G, 4G, or LTE network), a cable network, a satellite network, a public switched telephone network, a local area network, a wide area network, a fiber-optic network, any other suitable type of communications network, and/or any suitable combination of these communications networks.

In some embodiments, media content source 102, server(s) 104, communications network 106, and user device(s) 108 can be implemented in any suitable hardware. For example, each of media content source 102, server(s) 104, communications network 106, and user device(s) 108 can be implemented in any of a general purpose device such as a computer or a special purpose device such as a client, a server, mobile terminal (e.g., mobile phone), etc. Any of these general or special purpose devices can include any suitable components such as a hardware processor (which can be a microprocessor, digital signal processor, a controller, etc.). In some embodiments, each of media content source 102, server(s) 104, communications network 106, and user device(s) 108 can include a suitable storage device, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same.

In some embodiments, each of media content source 102, server(s) 104, communications network 106, and user device (s) 108 can be implemented as a stand-alone device or integrated with other components of architecture 100.

In some embodiments, media content source 102 can be connected to server(s) 104 and communications network 106 through communications paths 110 and 112, respectively. In some embodiments, communications network 106 can be connected to server(s) 104 and user device(s) 108 through communications paths 114 and 116, respectively.

Communications paths 110, 112, 114, and 116 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments.

Figure 4:
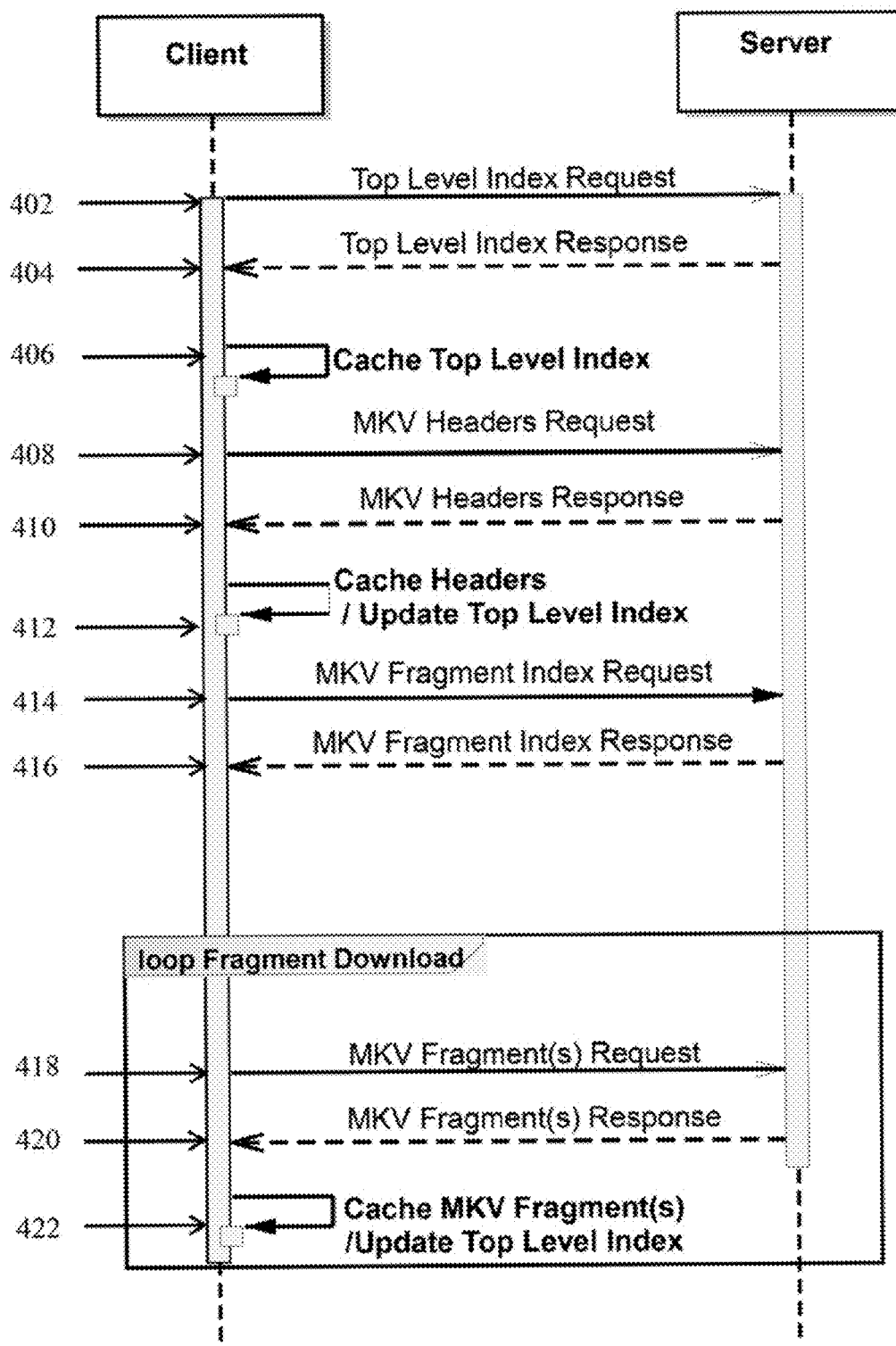
FIG. 4 shows a flow chart of an example of a process for streaming media content in accordance with some embodiments of the invention.

Turning to FIG. 4, an example 400 of a process for streaming and storing media content in accordance with some embodiments of the disclosure is shown. In some embodiments, process 400 can be implemented in a suitable user device (such as user device 108 of in FIG. 1).

As illustrated, process 400 can begin by requesting a top level index file at 402. The top level index file can be requested in any suitable manner. For example, the user device can request the top level index file by sending one or more requests containing information about the name of the top level index file, the resources from which the top level index file can be obtained, the location of the top level index file, etc. under a suitable protocol (e.g., such as HTTP, TCP, etc.). In a more particular example, the user device can send to the server one or more HTTP requests containing information about one or more URIs associated with the top level index file to the server.

Next, at 404, the user device can receive a top level index file from the server. The top level index file can be received in any suitable manner. For example, the top level index file can be received via one or more responses that are sent by the server. In a more particular example, in the example described above where one or more HTTP requests are used to request the top level index file, the user device can receive the top level index file via one or more HTTP responses that are sent by the server in response to the HTTP requests.

In some embodiments, the top level index file can include any suitable information relating to one or more media content files (e.g., such as Matroska container files, etc.). In a more particular example, top level index file 220 as described above in connection with FIG. 2 can be received at 404.

In some embodiments, the top level index file can be received in any suitable format. For example, the received top level file can be a SMIL file, an XML file, etc.

At 406, the user device can store the received top level index file. The top level index file can be stored in any suitable manner. For example, the top level index file can be cached in a suitable format (e.g., as an index file 710 of FIG. 7 that can be a SMIL file, an XML file, etc.). In a more particular example, as shown in FIG. 6, the cached top level index file 710 can include any suitable portions of SMIL file 600 as shown in FIG. 6.

At 408, the user device can request one or more headers associated with one or more Matroska container files. Each of the headers can contain any suitable information relating to the version of its corresponding Matroska container file, the media content contained in the Matroska container file, the components of the Matroska container file, etc. For example, each of the headers can include one or more header elements of a Matroska container file (e.g., such as video files 212 or 214, audio file 216, subtitle file 218, etc. as illustrated in FIG. 2). In a more particular example, as described above in connection with FIG. 3, each of the headers can include an EBML element, a segment element, a seekhead element, a segmentinfo element, a tracks elements, and/or any other suitable components.

In some embodiments, the headers can be requested in any suitable manner. For example, the headers can be requested based on the top level index file received at 404. In a more particular example, the user device can parse the top level index file and obtain information relating to one or more URIs corresponding to the headers. The user device can then send one or more requests (e.g., HTTP requests, etc.) containing the URIs to the server.

At 410, the user device can receive one or more headers associated with one or more Matroska container files. The headers can be received in any suitable manner. For example, the headers can be received via one or more responses that are sent by the server. In a more particular example, in the example described above where one or more HTTP requests are used to request the headers, the user device can receive the headers via one or more HTTP responses that are sent by the server in response to the HTTP requests.

More particularly, for example, one or more of a header of a video file (e.g., video file 212 and/or video file 214 of FIG. 2), a header of an audio file (e.g., audio file 216 of FIG. 2), and a header of a subtitle file (e.g., subtitle file 218 of FIG. 2) can be received in response to the requests sent at 408.

Figure 7:
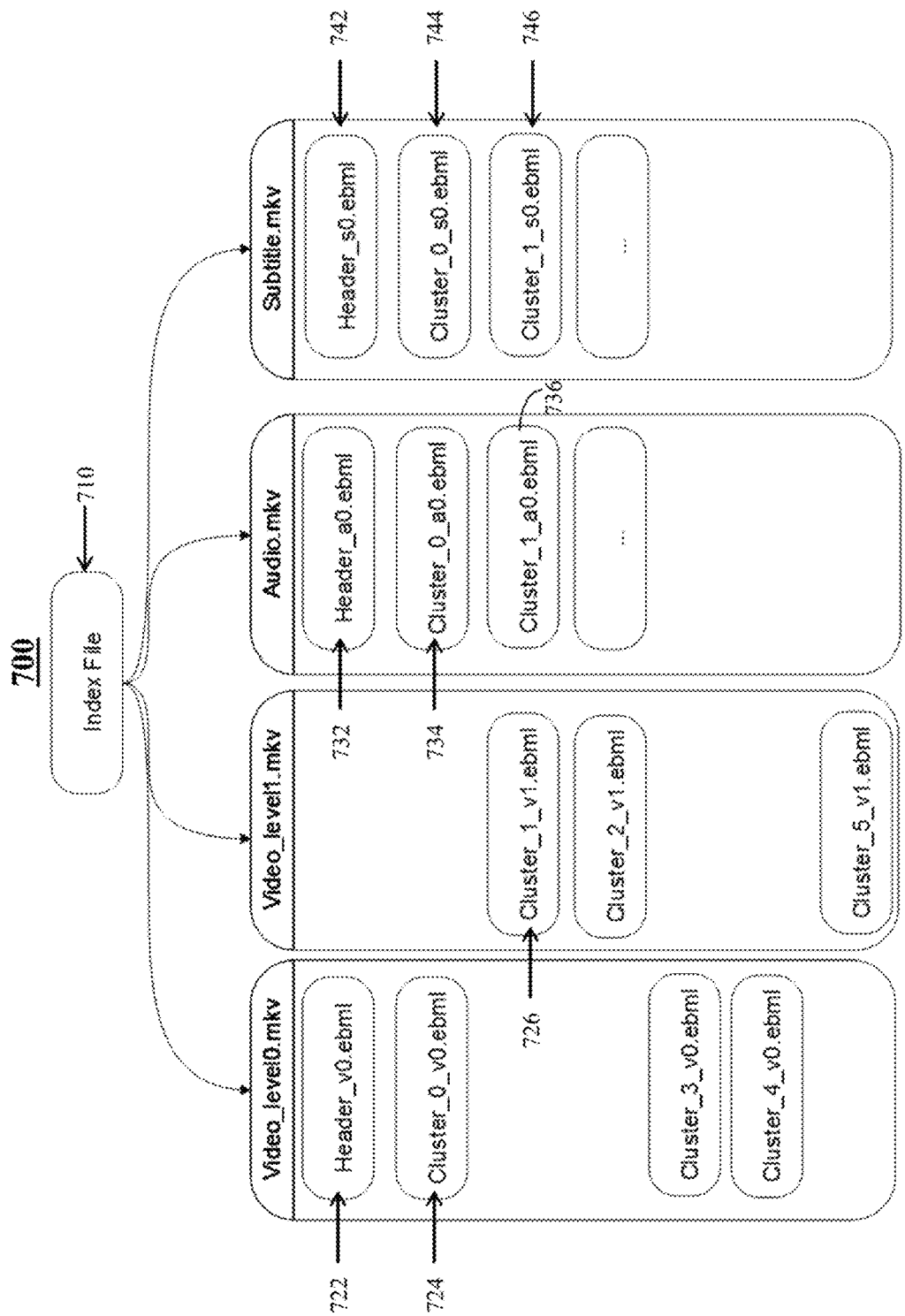
FIG. 7 shows an example of Matroska container files containing cached media content in accordance with some embodiments of the invention.

Next, at 412, the user device can store the received headers and update the top level index file. The headers can be stored in any suitable manner. For example, each of the received headers can be cached as a Matroska container file. In a more particular example, as illustrated in FIG. 7, each of the header of the video file (e.g., video file 212 of FIG. 2), the header of the audio file (e.g., audio file 216 of FIG. 2), and the header of the subtitle file (e.g., subtitle file 218 of FIG. 2) can be cached as an EBML file, i.e., header file 722, header file 732, and header file 742, respectively. In some embodiments, each of header files 722, 742, and 752 can have a structure similar to header element 310 of FIG. 3.

In some embodiments, in response to caching the header file(s), the user device can update the top level index file. The top level index file can be updated in any suitable manner. For example, the top level index file can be updated to include information relating to the one or more headers that have been received and cached, such as the location of the header file(s), the size of the header file(s), etc.

At 414, the user device can request fragment index information. Any suitable fragment index information can be requested. For example, the user device can request one or more index elements associated with one or more Matroska container files as described above in connection with FIGS. 2 and 3. Alternatively or additionally, the user device can request one or more suitable portions of the index elements from the server.

The fragment index information can be requested in any suitable manner. For example, the user device can request the fragment index information based on the top level index file received at 404. In a more particular example, the user device can parse the top level index file and obtain information relating to one or more URIs corresponding to the fragment index information. The user device can then send one or more requests (e.g., HTTP requests, etc.) containing the URIs to the server.

As another example, the user device can request the fragment index information based on one or more of the headers received at 410. In a more particular example, the user can make such requests based on information relating to the location of the fragment index information (e.g., such as a seekhead element of a header).

At 416, the user device can receive the requested fragment index information. The fragment index information can be received in any suitable manner. For example, the fragment index information can be received via one or more responses that are sent by the server. In a more particular example, in the example described above where one or more HTTP requests are used to request the fragment index information, the user device can receive the fragment index information via one or more HTTP responses that are sent by the server in response to the HTTP requests. In some embodiments, the user device does not need to cache or store the received fragment index information.

At 418, the user device can request one or more media content fragments from the server. Any suitable media content fragments can be requested. For example, the user device can request one or more cluster elements of one or more Matroska container files containing media content corresponding to a particular timecode (e.g., such as a particular start time and/or a particular end time). In a more particular example, the user device can request one or more cluster elements of a video file (e.g., video file 212 and/or 214 of FIG. 2), an audio file (e.g., audio file 216 of FIG. 2), a subtitle file (e.g., subtitle file 218 of FIG. 2) that contain media content corresponding to the particular timecode.

As another example, the user device can request one or more media content fragments containing media content having a particular version. In a more particular example, the user device can request a Cluster element of a video file that contains encoded video content having a particular bit rate, a particular frame rate, a particular resolution, etc.

In some embodiments, the media content fragments can be requested in any suitable manner. For example, the user device can request the media content fragment(s) based on the streaming conditions experienced by the user device, such as the network bandwidth, the processor capacity, etc. that can be utilized to transmit media content, one or more user preferences (e.g., such as a desired resolution, a desired bit rate, etc.), etc. In a more particular example, upon determining the network bandwidth that can be utilized to transmit media content, the user device can request a cluster of a video file (e.g., video file 212, video file 214, etc. as illustrated in FIG. 2) containing encoded video content having a suitable bit rate that can be transmitted using the network bandwidth.

As another example, the user device can send to the server one or more requests containing information relating to the names of the media content fragments, the resources from which the media content fragments can be obtained, and/or other suitable information relating to the media content fragments using a suitable protocol (e.g., such as HTTP, TCP, etc.). In a more particular example, the requests can contain one or more URIs corresponding to the media content fragments to be requested. In some embodiments, the URIs can be obtained based on the top level index file. More particularly, for example, the user device can parse the top level index file received at 404 and obtain one or more URIs corresponding to one or more cluster elements to be requested.

At 420, the user device can receive one or more media content fragments. The media content fragments can be received in any suitable manner. For example, the media content fragments can be received via one or more responses that are sent by the server. In a more particular example, in the example described above where one or more HTTP requests are used to request the media content fragments, the user device can receive the media content fragments via one or more HTTP responses that are sent by the server in response to the HTTP requests.

In some embodiments, in response to receiving the media content fragment, the user device can extract media content data (e.g., such as video data, audio data, subtitles, etc.) from the media content fragments. The user device can then decode the media content data and cause the decoded media content to be rendered. For example, in response to receiving a cluster of a video file as described above, the user device can extract encoded video data from the block elements of the cluster element. The user device can then decode the encoded video data and cause the decoded video data to be displayed on a suitable display. In a more particular example, the decoded video data can be displayed based on one or more timecodes associated with the cluster element.

Next, at 422, the user device can store the received media content fragments and update the top level index file. The media content fragments can be stored in any suitable manner. For example, upon receiving a cluster element of a Matroska container file (e.g., such as Matroska container files 210 of FIG. 2), the user device can cache the cluster element as a Matroska container file. In a more particular example, in response to receiving a cluster element of video file 212 of FIG. 2 (e.g., cluster element 321 as shown in FIG. 3), the user device can cache the received cluster element as an EBML file 724 as shown in FIG. 7. In another more particular example, in response to receiving a cluster of an audio file (e.g., audio file 216 of FIG. 2), the user device can cache the cluster element as an EBML file 734 as shown in FIG. 7. In yet another more particular example, in response to receiving a cluster of a subtitle file (e.g., subtitle file 218 of FIG. 2), the user device can cache the cluster element as an EBML file 744 as shown in FIG. 7.

In some embodiments, in response to caching the media content fragments, the user device can update the top level index file that has been stored in the user device. The top level index file can be updated in any suitable manner. For example, the user device can edit the top level index file to include information relating to the EBML file that stores the media content fragments.

In a more particular example, in the example described above where a cluster of video file 212 (FIG. 2) is cached as EBML file 724, the user device can include a video element 610 in top level index file 600 of FIG. 6 corresponding to EBML file 724. As shown, video element 610 can include a URI element 612, a start-time element 614, an end-time element 616, and a param element 618. URI element 612 can include any suitable information relating to the name of the cached EBML file, the location of the EBML file, and/or any other suitable information about the cached EBML file. In a more particular example, URI element 612 can include a file path through which EBML file 724 can be retrieved.

In some embodiments, start-time element 614 and end-time element 616 can contain information about the start time and the end time of the media content contained in the cached cluster element, respectively.

In some embodiments, param element 618 can include any suitable information about the cached EBML file. For example, param element 618 can include information about the size of the cached EBML file. As another example, param element 618 can include information about the bit rate, the resolution, the frame rate, etc. of the media content contained in the cached EBML file.

In some embodiments, in response to receiving and/or caching the media content fragment, the user device can extract media content data (e.g., such as video data, audio data, subtitles, etc.) from the media content fragments. The user device can then decode the media content data and cause the decoded media content to be rendered. For example, in response to receiving a cluster of a video file as described above, the user device can extract encoded video data from the block elements of the cluster element. The user device can then decode the encoded video data and cause the decoded video data to be displayed on a suitable display. In a more particular example, the decoded video data can be displayed based on one or more timecodes associated with the cluster element.

Referring back to FIG. 4, in some embodiments, after step 422 is performed, process 400 can loop back to 418. That is, process 400 can request, receive, and/or cache one or more media content fragments. The media content fragments can be requested in any suitable manner. For example, process 400 can request a Cluster element corresponding to a particular timecode. In a more particular example, in the example where cluster 321 (FIG. 3) of audio file 216 (FIG. 2) has been cached as EBML file 734, the user device can request and receive cluster element 326 (FIG. 3) of audio file 216 (FIG. 2) and cache the received cluster element as an EBML file 736 as illustrated in FIG. 7.

In another more particular example, in the example where cluster 321 (FIG. 3) of subtitle file 218 (FIG. 2) has been cashed as EBML file 744, the user device can request and receive cluster element 326 (FIG. 3) of subtitle file 218 (FIG. 2) and cache the received Cluster element as an EBML file 746 as illustrated in FIG. 7.

As another example, process 400 can also request a cluster element of a Matroska container file that contains a particular version of a piece of media content based on the streaming conditions experienced by the user device and/or user preferences. More particularly, for example, the user device can determine the bandwidth, the processor capacity, etc. that can be utilized to transmit media content. Alternatively or additionally, the user device can determine a particular frame rate, a particular resolution, and/or other parameters about the media content to be rendered that are preferred by a user. The user device can then request a cluster element containing video data having a suitable bit rate, a suitable frame rate, a suitable resolution, etc. based on the streaming conditions and/or user preferences.

In a more particular example, in the example where cluster 321 (FIG. 3) of video file 212 (FIG. 2) has been cashed as EBML file 724, the user device can request and receive cluster element 326 (FIG. 3) of video file 212 (FIG. 2) in response to determining that video file 214 (FIG. 2) contains video content having the suitable bit rate, frame rate, and/or resolution. The user device can also cache the received Cluster element as an EBML file 726 of FIG. 7.

In some embodiments, upon caching EBML file 726 (FIG. 7), the user device can also update top level index file 600 to include suitable information relating to EBML file 726. In a more particular example, as illustrated in FIG. 6, the user device can include a video element 620 in top level index file 600 corresponding to EBML file 726. As shown, video element 620 can include any suitable information relating to the name of the cached EBML file, the location of the EBML file, and/or any other suitable information about the cached EBML file, such as a file path through which EBML file 726 can be retrieved.

In some embodiments, each of the top level index file, the header file(s), the media content fragments, and other media content files (e.g., the EBML files as illustrated in FIG. 7) can be stored/cached for any suitable period of time. For example, a suitable cache duration can be specified for each of the stored/cached files, such as seconds, minutes, hours, days, weeks, months, or any suitable period of time. As another example, no particular cache duration needs to be specified for the stored/cached files. In such an example, the content stored/cached in the files can be stored for an indefinite duration and will not expire by time.

In some embodiments, upon caching/storing one or more EBML files as described above, the user device can cause the cached media content contained in the EBML files to be rendered. The cached media content can be rendered at any suitable time. For example, the cached media content can be rendered when the user device is streaming media content from the server (e.g., using process 400 or other suitable processes). In a more particular example, upon receiving one or more media content fragments, the user device can simultaneously cache the media content fragment(s) and render the media content contained in the media content fragment(s). In another more particular example, the user device can request, receive, and/or cache one or more media content fragments as fast as it can (e.g., by utilizing the available bandwidth, hardware capacity, etc.). The user device can then render the media content fragment(s).

As another example, the media content can be rendered after the user device has finished streaming and/or caching media content from the server. In a more particular example, the user device can cause the cached media content to be rendered upon a user requesting a playback of the cached media content at any time with or without a live communication connection with the server.

For example, the user device can retrieve the EBML files based on the cached top level index file. The user device can then extract the media content data (e.g., video data, audio data, subtitles, etc.) contained in the EBML files, decode the media content data, and cause the media content to be rendered based on the top level index file and/or one or more of the header files.

Figure 5:
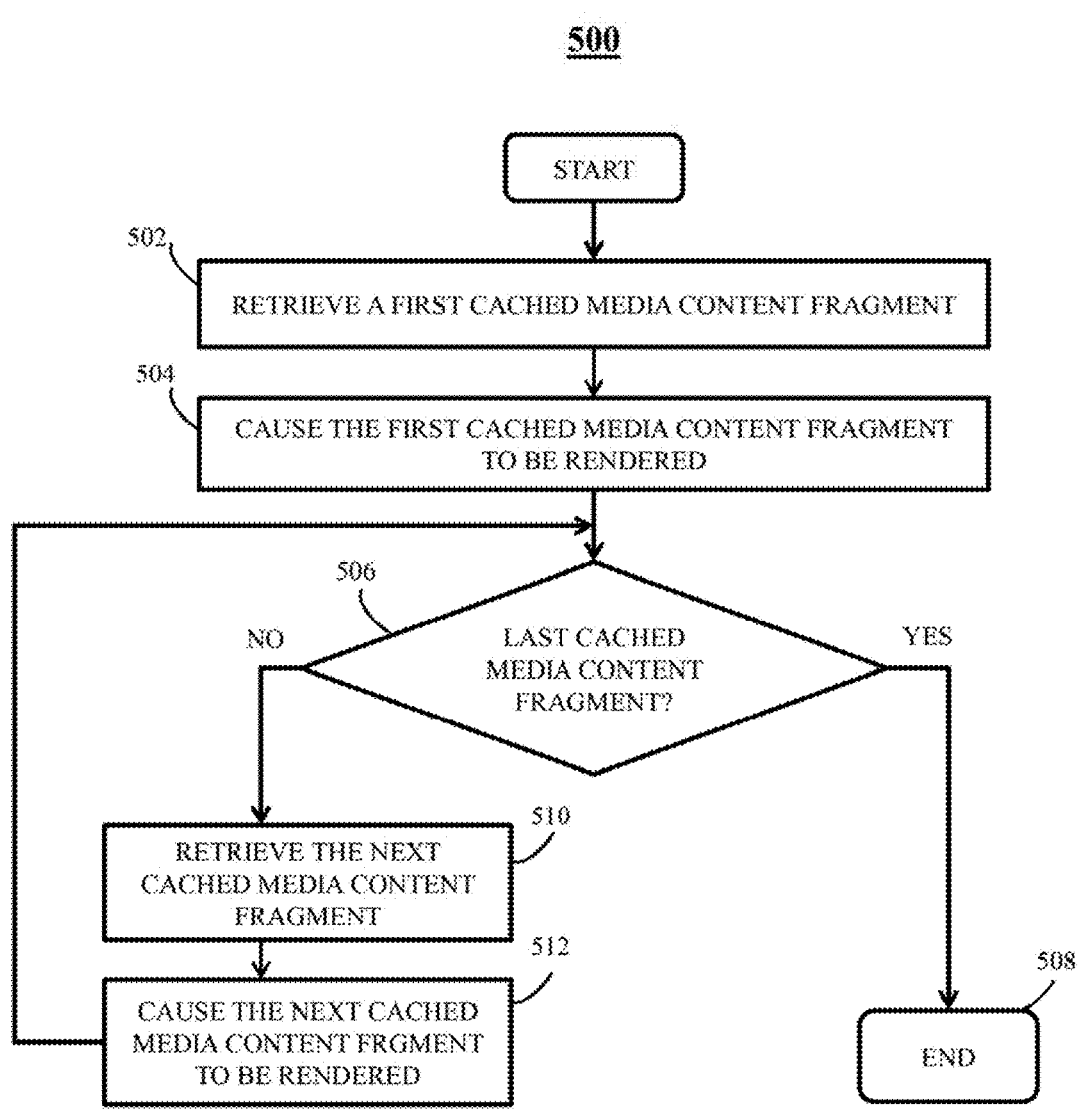
FIG. 5 shows a flow chart of an example of a process for rendering media content in accordance with some embodiments of the invention.

In a more particular example, as illustrated in FIG. 5, media content contained in multiple cashed/stored media content fragments can be rendered based on process 500. In some embodiments, process 500 can be implemented in a suitable user device (e.g., such as user device 108 of FIG. 1).

As shown, process 500 can begin by retrieving a first cached media content fragment at 502. For example, the user device can retrieve the first cached media content fragment based on the cached top level index file. More particularly, for example, the user device can parse the cached top level index file and extract data about the location of the media content file that contains the first cached media content fragment.

In a more particular example, as described above in connection with FIGS. 4, 6, and 7, the cached top level index file can include URI element 612 that is associated with EBML file 724 (FIG. 7) containing the first cached media content fragment. In such an example, the user device can locate EBML file 724 based on URI element 612 (e.g., by converting the URI into one or more files paths corresponding to the location of EBML file 724).

In some embodiments, upon retrieval of the first cached media content fragment, the user device can render the first cached media content fragment at 504. The first cached media content fragment can be rendered in any suitable manner. For example, the user device can extract and decode the media content data (e.g., video data, audio data, subtitles, etc.) from the retrieved EBML file. The user device can then cause the decoded media content data to be rendered. In a more particular example, the decoded content data can be rendered based on the cached header file (e.g., header file 722 of FIG. 7).

Next, at 506, the user device can determine whether the retrieved media content fragment is the last cached media content fragment to be retrieved and/or rendered. Such determination can be made in any suitable manner. For example, the user device can check the cached top level index file (e.g., top level index file 600 of FIG. 6) and determine whether all the cached media content files linked to the cached top level index file have been retrieved and/or rendered. As another example, a user can select one or more cached media content fragments to be rendered (e.g., one or more cached media content fragments corresponding to a scene of a movie, etc.). In such an example, the user device can determine whether all of the selected cached media content fragments have been retrieved and/or rendered at 506.

In some embodiments, in response to determining that the retrieved media content fragment is the last cached media content fragment to be retrieved and/or rendered, process 500 can end at 508.

In some embodiments, in response to determining that the retrieved media content fragment is not the last cached media content fragment to be retrieved and/or rendered, the user device can retrieve the next cached media content fragment at 510. For example, the user device can retrieve the second cached media content fragment based on the cached top level index file. More particularly, for example, the user device can parse the cached top level index file and extract data about the location of the media content file that contains the second cached media content fragment. In a more particular example, as described above in connection with FIGS. 4, 6, and 7, the cached top level index file can include URI element 622 associated with EBML file 726 (FIG. 7) that contains the second cached media content fragment. In such an example, the user device can locate EBML file 726 based on URI element 622 (e.g., by converting the URI into one or more files paths corresponding to the location of EBML file 726).

In some embodiments, in response to retrieval of the second cached media content fragment, the user device can render the second cached media content fragment at 512. The second cached media content fragment can be rendered in any suitable manner. For example, the user device can extract and decode the media content data (e.g., video data, audio data, subtitles, etc.) from the retrieved EBML file (e.g., EBML file 726 of FIG. 7). The user device can then cause the decoded media content data to be rendered. In a more particular example, the decoded content data can be rendered based on the cached header file (e.g., header file 722 of FIG. 7).

In some embodiments, after 512 is performed, process 500 can loop back to 506.

In some embodiments, the user device can cause a cached media content fragment to be rendered upon retrieval of the cached media content fragment. In some embodiments, the user device can retrieve multiple cached media content fragments and cause some or all of the retrieved media content fragments to be rendered in a suitable order.

It should be noted that process 400 of FIG. 4 and process 500 of FIG. 5 can be performed concurrently in some embodiments. It should also be noted that the above steps of the flow diagrams of FIGS. 4-5 may be executed or performed in any order or sequence not limited to the order and sequence shown and described in the figures. Furthermore, it should be noted, some of the above steps of the flow diagrams of FIGS. 4-5 may be executed or performed substantially simultaneously where appropriate or in parallel to reduce latency and processing times. And still furthermore, it should be noted, some of the above steps of the flow diagrams of FIGS. 4-5 may be omitted.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A method for streaming media content, the method comprising:
   receiving on a playback device top level index data from a manifest server;
   caching the top level index data in a top level index file on the playback device, wherein the top level index file comprises Uniform Resource Identifiers (URIs) for a plurality of media content files with different versions;
   parsing the top level index file to obtain a URI of at least one header associated with a first media content file;
   sending at least one request that includes the URI of the at least one header associated with the first media content file to a server;
   receiving on the playback device header data associated with the first media content file from the server;
   caching the header data in a header file cached on the playback device;
   updating the top level index file using the playback device to include a URI providing a file path location of the header file on the playback device;
   obtaining at least one URI corresponding to a first fragment of the first media content file based on the top level index file;
   requesting the first fragment from a server based on the at least one URI corresponding to the first fragment;
   receiving on the playback device the first fragment of the first media content file based at least in part on the top level index file;
   caching the first fragment of the first media content file in a first file on the playback device;
   updating the top level index file using the playback device to include a URI providing the file path location of the first file that includes the cached first fragment within the storage of the playback device;
   receiving a request for playback of media content;

retrieving the cached header file based on the updated top level index file by parsing the top level index file to obtain the URI providing the file path location of the cached header file within the storage of the playback device;

configuring a decoder based at least in part upon the header data within the cached header file;

retrieving the cached first fragment based on the updated top level index file by parsing the updated top level index file to obtain the URI providing the file path location of the first file that includes the cached first fragment within the storage of the playback device;

extracting and decoding media content data from the cached first fragment using the decoder;

causing the decoded media content data to be displayed.

2. The method of claim 1, further comprising:

receiving a second fragment of a second media content file based at least in part on the top level index file;

caching the second fragment of the second media content file in a second file;

updating the top level index file to include a URI providing a location of the second file; and causing the second fragment to be displayed based at least in part on the updated top level index file and the header file.

3. The method of claim 2, wherein the second media content file and the first media content file contain encoded video data having different bit rates.

4. The method of claim 2, wherein the second media content file and the first media content file contain encoded video data having different frame rates.

5. The method of claim 2, wherein the second media content file and the first media content file contain encoded video data having different resolutions.

6. The method of claim 2, further comprising retrieving the second fragment based on the updated top level index file.

7. The method of claim 1, further comprising:

obtaining at least one URI corresponding to a second fragment based on the top level index file; and requesting the second fragment from the server based on the at least one URI.

8. The method of claim 1, further comprising:

requesting fragment index data based at least in part on the top level index file; and receiving the fragment index data from the server.

9. The method of claim 1, further comprising retrieving the first file based on the updated top level index file.

10. The method of claim 1, further comprising simultaneously caching the first fragment of the first media content file and causing the first fragment to be displayed.

11. The method of claim 1, wherein the first file is an Extensible Binary Meta Language (EBML) container file.

12. A system for streaming media content, the system comprising:

at least one hardware processor that is configured to:

receive top level index data from a manifest server;

cache the top level index data in a top level index file, wherein the top level index file comprises Uniform Resource Identifiers (URIs) for a plurality of media content files with different versions;

parse the top level index file to obtain a URI of at least one header associated with a first media content file;

send at least one request that includes the URI of the at least one header associated with the first media content file to a server;

receive header data associated with the first media content file from the server;

cache the header data in a header file cached within a storage of the system;

update the top level index file to include a URI providing a file path location of the header file within the storage of the system;

obtain at least one URI corresponding to a first fragment of the first media content file based on the top level index file;

request the first fragment from a server based on the at least one URI corresponding to the first fragment;

receive the first fragment of the first media content file based at least in part on the top level index file;

cache the first fragment of the first media content file in a first file within the storage of the system;

update the top level index file to include a URI providing a file path location of the first file that includes the cached first fragment within the storage of system;

receive a request for playback of media content;

retrieve the cached header file based on the updated top level index file by parsing the top level index file to obtain the URI providing the file path location of the cached header file within the storage of the playback device;

configure a decoder based at least in part upon the header data within the cached header file;

retrieve the cached first fragment based on the updated top level index file by parsing the updated top level index file to obtain the URI providing the file path location of the first file that includes the cached first fragment within the storage of the playback device;

extract and decode media content data from the cached first fragment using the decoder;

cause the decoded media content data to be displayed.

13. The system of claim 12, wherein the at hardware processor is further configured to:

receive a second fragment of a second media content file based at least in part on the top level index file;

cache the second fragment of the second media content file in a second file;

update the top level index file to include a URI providing the file path location of the second file; and cause the second fragment to be displayed based at least in part on the updated top level index file and the header file.

14. The system of claim 13, wherein the second media content file and the first media content file contain encoded video data having different bit rates.

15. The system of claim 13, wherein the second media content file and the first media content file contain encoded video data having different frame rates.

16. The system of claim 13, wherein the second media content file and the first media content file contain encoded video data having different resolutions.

17. The system of claim 13, wherein the hardware processor is further configured to retrieve the second file based on the updated top level index file.

18. The system of claim 12, wherein the hardware processor is further configured to:

obtain at least one URI corresponding to a second fragment based on the top level index file; and request the second fragment from the server based on the at least one URI.

19. The system of claim 12, wherein the hardware processor is further configured to:

request fragment index data based at least in part on the top level index file; and receive the fragment index data from the server.

20. The system of claim 12, wherein the hardware processor is further configured to retrieve the first file based on the updated top level index file.

21. The system of claim 12, wherein the at least one hardware processor is further configured to simultaneously cache the first fragment of the first media content file and cause the first fragment to be displayed.

22. The system of claim 12, wherein the first file is an Extensible Binary Meta Language (EBML) container file.

23. A non-transitory computer-readable medium containing computer-executable instructions that, when executed by a hardware processor, cause the hardware processor to perform a method for streaming media content, the method comprising:

receiving top level index data from a manifest server;

caching the top level index data in a top level index file, wherein the top level index file comprises Uniform Resource Identifiers (URIs) for a plurality of media content files with different versions;

parsing the top level index file to obtain a URI of at least one header associated with a first media content file;

sending at least one request that includes the URI of the at least one header associated with the first media content file to a server;

receiving header data associated with the first media content file from the server;

caching the header data in a header file cached within a storage;

updating the top level index file to include a URI providing a file path location of the header file within the storage;

obtaining at least one URI corresponding to a first fragment of the first media content file based on the top level index file;

requesting the first fragment from a server based on the at least one URI corresponding to the first fragment;

receiving the first fragment of the first media content file based at least in part on the top level index file;

caching the first fragment of the first media content file in a first file within the storage;

updating the top level index file to include a URI providing the file path location of the first file that includes the cached first fragment within the storage;

receiving a request for playback of media content;

retrieving the cached header file based on the updated top level index file by parsing the top level index file to obtain the URI providing the file path location of the cached header file within the storage of the playback device;

configuring a decoder based at least in part upon the header data within the cached header file;

retrieving the cached first fragment based on the updated top level index file by parsing the updated top level index file to obtain the URI providing the file path location of the first file that includes the cached first fragment within the storage of the playback device;

extracting and decoding media content data from the cached first fragment using the decoder;

causing the decoded media content data to be displayed.

24. The non-transitory computer-readable medium of claim 23, wherein the method further comprises:

receiving a second fragment of a second media content file based at least in part on the top level index file;

caching the second fragment of the second media content file in a second file;

updating the top level index file to include a URI providing a location of the second file; and causing the second fragment to be displayed based at least in part on the updated top level index file and the header file.

25. The non-transitory computer-readable medium of claim 24, wherein the second media content file and the first media content file contain encoded video data having different bit rates.

26. The non-transitory computer-readable medium of claim 24, wherein the second media content file and the first media content file contain encoded video data having different frame rates.

27. The non-transitory computer-readable medium of claim 24, wherein the second media content file and the first media content file contain encoded video data having different resolutions.

28. The non-transitory computer-readable medium of claim 24, wherein the method further comprises retrieving the second file based on the updated top level index file.

29. The non-transitory computer-readable medium of claim 23, wherein the method further comprises:

obtaining at least one URI corresponding to a second fragment based on the top level index file; and requesting the second fragment from the server based on the at least one URI.

30. The non-transitory computer-readable medium of claim 23, wherein the method further comprises:

requesting fragment index data based at least in part on the top level index file; and receiving the fragment index data from the server.

31. The non-transitory computer-readable medium of claim 23, wherein the method further comprises retrieving the first file based on the updated top level index file.

32. The non-transitory computer-readable medium of claim 23, wherein the method further comprises simultaneously caching the first fragment of the first media content file and causing the first fragment to be displayed.

33. The non-transitory computer-readable medium of claim 23, wherein the first file is an Extensible Binary Meta Language (EBML) container file.

* * * * *